Figure 1:
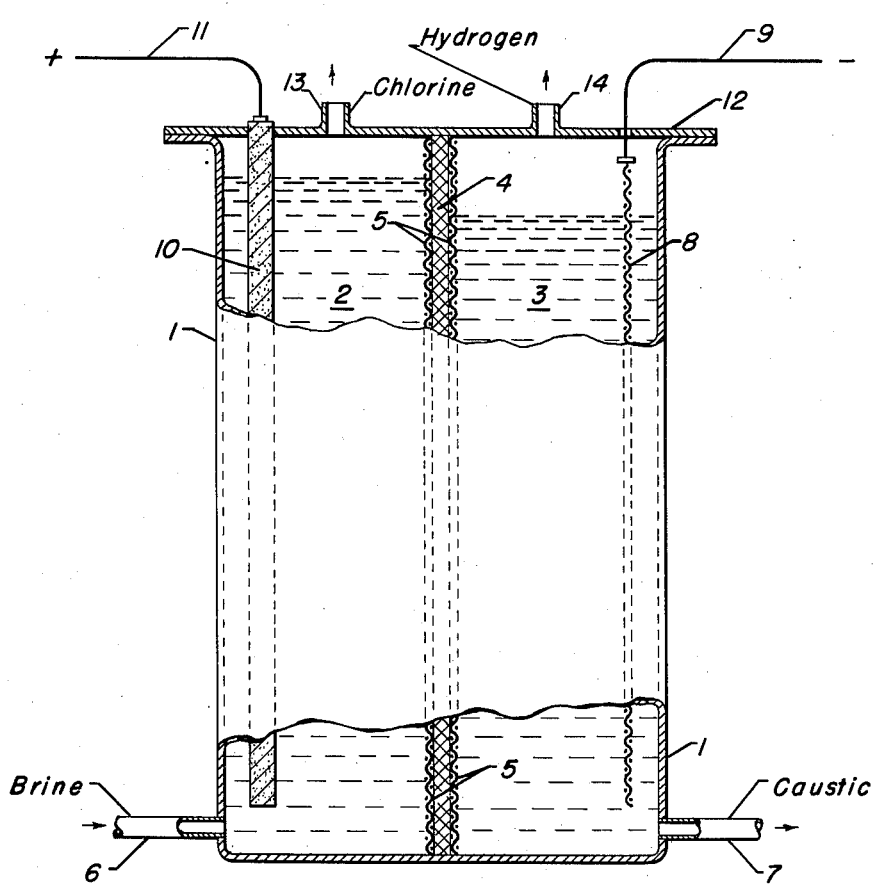

Sept. 25, 1962 N. C. RUFF 3,055,811
ELECTROLYSIS WITH IMPROVED PLATINUM PLATED
TITANIUM ANODE AND MANUFACTURE THEREOF
Filed May 8, 1961 2 Sheets-Sheet 1

INVENTOR:
Norbert C. Ruff

BY, Chester J. Giuliani
Philip J. Liggett
ATTORNEYS

United States Patent Office 3,055,811
Patented Sept. 25, 1962

3,055,811
ELECTROLYSIS WITH IMPROVED PLATINUM PLATED TITANIUM ANODE AND MANUFACTURE THEREOF
Norbert C. Ruff, Bloomer, Wis., assignor, by mesne assignments, to Universal Oil Products Company, Des Plaines, Ill., a corporation of Delaware
Filed May 8, 1961, Ser. No. 108,654
9 Claims. (Cl. 204—128)

This invention is directed to an improved method for effecting the electrolysis of an alkaline chloride solution with an improved platinum plated anode, as well as to means for preparing an activated platinum coated titanium electrode which provides improved operating results.

The electrolysis of a solution of an alkaline chloride, such as brine (NaCl), has been widely utilized as a method for producing chlorine and caustic. The sodium ion travels to the cathode during the process, such that sodium hydroxide (NaOH) and hydrogen gas are produced at the cathode. The chlorine ion travels to the anode and gaseous chlorine is evolved, although a small portion of the gaseous material may become dissolved in the brine solution. Brine may be continuously supplied to a chamber or cell at the zone of the anode and caustic may be continuously withdrawn from the cell at the zone of the cathode. At the same time gaseous chlorine and hydrogen may be separately withdrawn overhead from the cell. In modified cells which employ mercury, the mercury acts as a cathode and sodium traveling thereto becomes amalgamated with the mercury. Otherwise the mercury cells operate in a manner similar to the electrolysis cell.

At the present time, graphite anodes are in general use in alkaline chloride electrolysis operations, however, there have been certain disadvantages which arise from the use of graphite. One serious disadvantage is the attrition of the graphite during the electrolysis operation. Attrition results in increasing the clearance or spacing of anode and cathode which in turn causes an increase in the cell voltage drop and a decreasing efficiency of operation. Also, resulting graphite particles tend to plug the diaphragms which divide the cells and shorten their service life. In mercury cells, graphite particles float on the surface of the mercury and serve as focal points for decomposition of the amalgam, causing the release of hydrogen which in turn contaminates the chlorine and reduces the over-all efficiency of the process.

Graphite anodes have a limited life, generally they are about 1½″ thick when originally installed, but at the end of a ten to twelve month period of continuous operation may be reduced to a thickness of less than ½″, and there is a resulting loss in power and a reduced efficiency. Consumption of graphite may amount to seven to fifteen pounds per ton of chlorine produced, all of which provides a substantial economic factor. Improved metallic anodes will have a greater life and may be fabricated from plates which are thinner than the graphite anodes, and when sufficiently resistant to anodic dissolution, they permit much closer clearances between electrodes, with marked increases in the capacity per unit of cell volume and in current efficiency.

It is thus a principal object of the present invention to provide an improved electrolysis of an alkaline chloride solution through the use of an improved form of platinum plated titanium anode.

It is another object of the present invention to provide a method for producing an improved type of platinum plated titanium anode which has a high activity or efficiency when used for electrolysis operations.

Still another object of the present invention is to provide a metallic anode comprising titanium plated with black amorphous platinum which has been especially treated to be highly active.

Various modes of plating, and various treatments subsequent to plating, may be utilized in carrying out the electroplating of the titanium, however, it has been found that special conditioning and activating procedures will result in an improved plated surface which is of a highly active nature immediately useful in initiating electrolysis operations when used as an electrode.

In a broad aspect, the present invention provides a method for producing chlorine from an alkaline chloride solution, which comprises, subjecting such solution to the passage of an electric current between an anode and cathode immersed therein at electrolysis conditions, with the anode consisting of a titanium member having at least one electroplated coating of platinum thereon, and with the plated coating having been activated at above about a temperature of 600° F. in the presence of an air stream containing hydrocarbon vapors for a period of time sufficient to initiate catalytic oxidation of such vapors over the entire platinum surface.

In another aspect, the present invention embodies a method for producing an activated platinum plated titanium anode useful for electrolysis operation, which comprises immersing a titanium panel in a hot cleaning solution and effecting the washing and removing of adhering material, subsequently immersing the washed panel in an acid solution and effecting the mild etching of the surface thereof, washing the etched panel, electrodepositing a coating of amorphous platinum over the entire surface thereof, rinsing and drying the resulting plated panel and heating it in the presence of a high temperature air stream, carrying hydrocarbon vapors in an amount sufficient to effect catalytic oxidation of such vapors over the entire surface of the coated panel and forming thereby a resulting highly active platinum plated anode.

In accordance with the present invention, the titanium panel or bar to be used as the improved anode is subjected to a cleaning operation by use of a suitable caustic cleaning material and detergent, as, for example, by an approximate fifteen minute immersion in a hot (180° F.) solution of sodium orthosilicate and tetrasodium pyrophosphate, together with a surface active agent, such as sodium alkyl arylsulfonate. Various detergent agents may be utilized and it is not intended to limit the cleaning operation to the use of any one type of agent or solution. Generally, less detergent will be used than caustic cleaning solution. The panel is rinsed in a cool water after the immersion in the cleaning solution.

Following the cleaning operation the panel is preferably subjected to a preconditioning etching operation, as, for example, the immersion of the element for from one to two minutes in a solution of ferric chloride and hydrochloric acid until there is a mildly etched surface. A suitable solution may comprise 390 milliliters of 37% hydrochloric acid and 122 grams of ferric chloride, at room temperature, however, the strength of the solution and the time utilized in the immersion may be varied to some degree, in accordance with the strength of the solution. The mildly etched element is then further subjected to a second washing operation in order to remove any loose scale or occluded material.

The platinum surface is preferably deposited by an electroplating operation whereby a thin fixed coating of platinum covers the entire surface of the unit. The electrodeposition may be carried out, for example, by using a bath consisting of 4.5 grams of platinic chloride and 22 milliliters of 37% hydrochloric acid dissolved in 2800 milliliters of water. The temperature is maintained between 160° F. and 170° F. and current intensity is such that no hydrogen is evolved at the titanium panel. A graphite anode is used in the bath and the titanium panel is made cathodic. The panel is moved or agitated during the plating operation. Also, current flow is regulated to preclude hydrogen involvement at the panel cathode, while coating to approximately 1 mm. in thickness of platinum in a two minute period of time. However, it may be pointed out that minor variations may be made in effecting the deposition of the noble metal and that varying thicknesses may be obtained by suitable modifications in the time consumed in the electroplating operation. Deposition of other metals of the platinum group may be carried out in a similar manner. Also, simultaneous deposition may be made of more than one component, as, for example, by effecting a coating from a solution containing another element along with platinum, such as iridium or caesium. Such other component being added to the electroplating bath whereby a desired resulting composite is obtained in the electrodeposition.

The conditioning of the platinum surface, after rinsing and drying the electroplated element, is carried out at a high temperature above about 600° F., and preferably in a temperature range reaching 1000° F. or higher. The temperature may be cycled between 700° F. and 1000° F. in an air stream moving at about 50 to 100 feet per minute and in the presence of hexane or naphtha vapors, such that there is obtained the catalytic oxidation of the hydrocarbon vapors as they pass over and around the plated panel. Sufficient hydrocarbon vapor is added to the hot air stream to provide a concentration equivalent to 10% to 15% of the lower limit of flammability. The oxidation reaction results in the formation of a dull, porous needle-like surface to the coating which is then ready for immediate use in the electrolysis operation.

In some instances, and in a preferred preparation procedure, it is found desirable to prepare a plated panel or anode which has had a second electroplating step in order to provide further deposition of the platinum to the surface thereof, in which case the panel is subjected to a second conditioning operation, providing washing and drying and heating operations, the latter step also being carried out in the presence of a combustible vapor such that there is a final activated surface coating ready for use.

In carrying out the electrolysis of an electrolyte, such as brine, to produce chlorine and caustic, the improved metallic anode of the present invention may be used in any form of cell. The titanium member may be a solid panel of a relatively heavy gage material, however, titanium screening of mesh may well be used to provide a lessor quantity of metal and a high surface area for the platinum coating.

The accompanying drawing indicates diagrammatically a simplified form of brine cell for an electrolysis operation in which a platinum plated titanium anode may be utilized. Referring now to the drawing there is shown a chamber 1 which is divided by a porous diaphragm-like member so as to form an anode section 2 and a cathode section 3. The diaphragm indicated in the present drawing shows an asbestos member 4 encased between a pair of stainless steel screen members 5, however other conventional types of porous members may be used to divide the cell into two sections. A brine inlet 6 connects with the lower end of the anode section 2, while a caustic outlet 7 connects with the lower portion of the cathode section 3. Suspended within the section is a stainless steel member 8 which connects with electrical line 9 and permitted to serve as a cathode in the electrolysis cell. Suspended within the anode section 2 is an anode member 10 connecting with the electric line 11. The anode 10 may be of graphite, or of an improved type in accordance with the present invention providing a titanium panel coating with an activated surface of platinum.

A closure member 12 at the top of the chamber 1 provides means for separately withdrawing chlorine and hydrogen from the top of the cell. A chlorine outlet 13 is provided above the anode section 2 while a hydrogen outlet 14 is provided above the top of the cathode section 3. Suitable D.C. current supply means, not shown, is provided to connect with the electric lead lines 9 and 11 such that there may be a current flow through the cell to effect the electrolysis of the electrolyte which is placed in the cell. Generally, suitable electric current control means is supplied in connection with lines leading to the cell such that there is an over-all control of the current flow and of the electrolysis operation. The present drawing indicates the cathode member 8 to be of a metallic screen, however, it is to be pointed out that suitable conventional types of metallic panels or members may be used in the cell to serve as the cathode member. The anode is indicated as a solid panel, but may be of a perforate or screen-like design having high surface areas. In order to more clearly illustrate the advantages and improved operation of a platinum plated titanium anode, as prepared by the method of the present invention, the following examples set forth comparative operations.

*Example I*

An electric cell constructed in a manner similar to that set forth in the accompanying drawing and described hereinabove, was used in the test operation. The electrolyte was a saturated chloride solution placed in the cell at room temperature. The level of the brine was, however, maintained at a slightly higher elevation in the anode section than in the cathode section in order to provide diffusion of the brine through the cell dividing diaphragm in the direction of the cathode in the unit.

The D.C. current to the electrode was supplied through a rectifier having a voltage control device such that current flow could be carefully regulated and controlled. Current flow through the cell was measured by an ammeter while voltage-drop across the cell was measured by a voltmeter. The cathode member was a stainless steel screen and was held in a fixed position such that a fixed predetermined distance could be maintained between the cathode and anode. A graphite panel, approximately 3 inches by 3 inches and ¼″ thick, that had been removed from a commercial chlorine caustic cell, was used as an anode in the present Example I. In the electrolysis operation current flow through the cell was varied and voltage drops across the cell measured as a function of current flow. The resulting curve, plotting voltage drop against current flow, in amperes, is shown as line "A" in FIGURE 2 of the drawings.

*Example II*

A second electrolysis operation was carried out, using brine as the electrolyte, and using the apparatus arrangement as set forth in Example I, except that the anode used in the anode section of the cell was a titanium panel, having the size of 3 inches by 3 inches and a 16 gauge thickness, which was coated with an electro-deposited amorphous coating of platinum. The platinum coating was deposited from the use of a platinic chloride and hydrochloric acid bath in a manner similar to that described hereinbefore, however, in this example, the resulting platinum coating on the anode was not subjected to the conditioning treatment involving the heating of the member in a high temperature air stream having hydrocarbon vapors introduced thereto. In other words, the present anode was used after undergoing the electroplating operation only.

Figure 2:
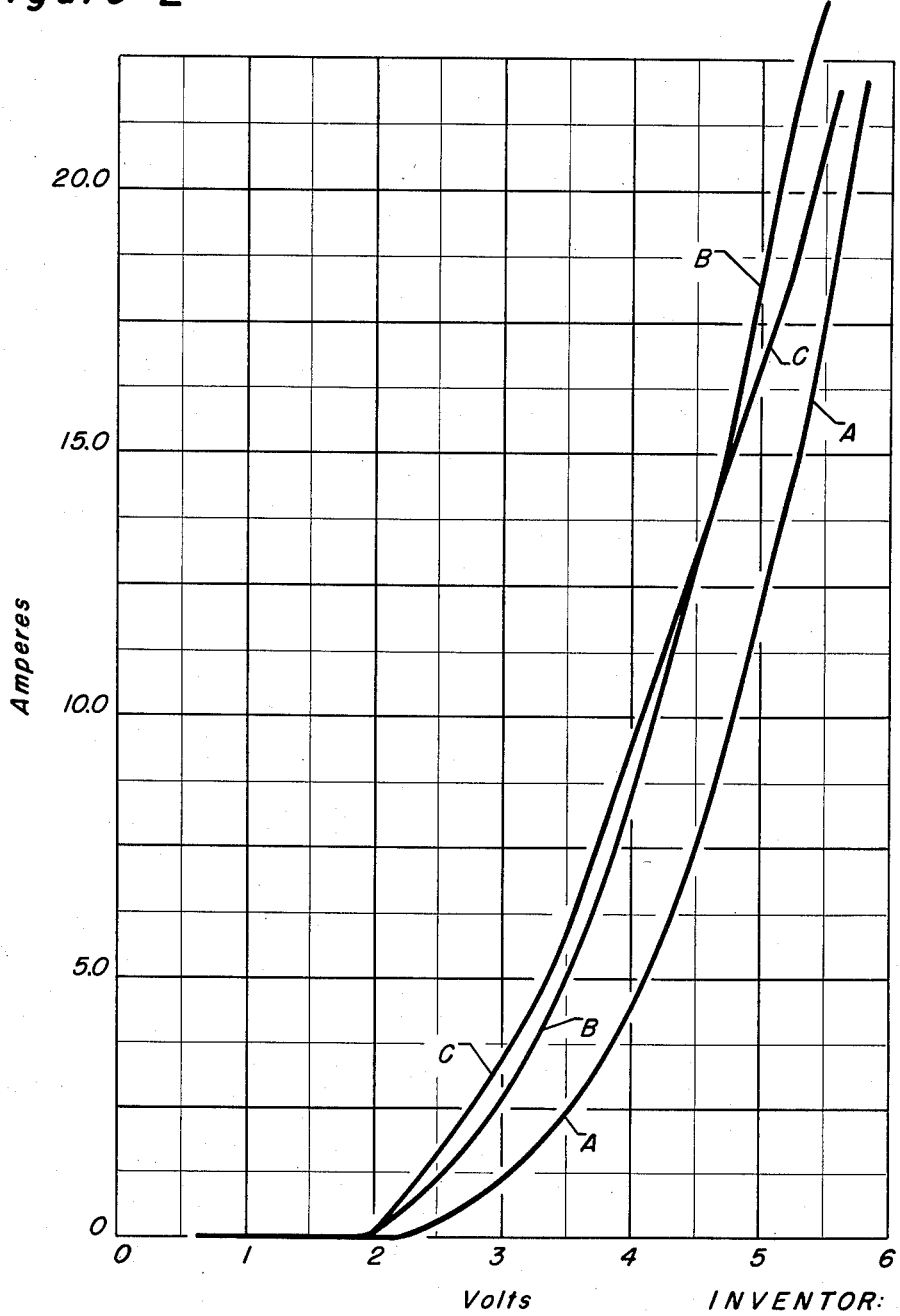

Using the plated anode in the electrolysis operation, with a varying current flow, the curve "B" of FIGURE 2 of the drawing resulted from plotting the varying voltage drops as a function of a varying current flow.

*Example III*

In still another operation, an electrolysis of a brine solution was carried out using a platinum plated titanium anode in an apparatus which was the same as was used for Examples I and II. The platinum plated anode of the present test was, however, prepared in accordance with the manufacturing procedure set forth hereinbefore, in full, including two separate electroplating steps on the titanium panel and with first and second conditioning treatments, using high temperature air of the order of 700° F. to 1000° F. containing hydrocarbon vapors introduced thereto so as to cause catalytic oxidation over the entire surface of the plated panel during each heat conditioning step. In other words, the high temperature air treatment with hydrocarbon vapors was carried out after each of the two plating operations so that the resulting anode had been twice plated and twice conditioned.

The electrolysis of the brine solution, while varying the current flow and measuring voltage drops across the cell, provided a curve "C" which is also shown in the accompanying FIGURE 2.

It will be noted by comparing the results of the different examples that the platinum plated titanium anodes provided more favorable operating conditions providing lesser voltage drops for equivalent current intensities and as a result more favorable polarization for effecting an electrolysis operation. At the same time, of course, the improved metallic electrodes are capable of operating for long periods of time without being subjected to rapid deterioration or attrition such as occurs in connection with the graphite anodes.

I claim as my invention:

1. A method for producing a platinum plated titanium anode which comprises, electrodepositing a coating of amorphous platinum on a titanium member and activating said platinum coating by heating at a temperature above about 600° F. in the presence of an air stream containing hydrocarbon vapors for a period of time sufficient to initiate catalytic oxidation of such vapors on the platinum surface.

2. The method of claim 1 further characterized in that said titanium member is electro-plated with platinum from a chloroplatinic acid solution while at a temperature of from 160° F. to 170° F. and while maintaining a current intensity sufficient to produce an adherent amorphous coating of platinum of about one millimeter of thickness in a two minute period while substantially precluding hydrogen evolvement at the member during the plating period.

3. The method of claim 1 further characterized in that said titanium member is subjected to a second electro-deposition of platinum after the first said coating operation whereby to add a second thin layer of amorphous platinum thereto, and the resulting twice coated titanium member is subjected to a heating and conditioning at a temperature above about 600° F. in a stream of high temperature air carrying hydrocarbon vapors for a period of time sufficient to effect catalytic oxidation of such vapors over the entire surface thereof, whereby to provide a highly activated surface on said member.

4. A method for producing an activated surface platinum plated titanium anode which comprises, immersing a titanium panel in a hot cleaning solution and washing and removing adhering material, subsequently immersing the washed panel in an acid solution and mildly etching the surface thereof, washing said panel and electro-depositing a coating of amorphous platinum over the entire surface thereof, rinsing and drying said coated panel and heating it in the presence of a high temperature air stream carrying hydrocarbon vapors at a temperature of from about 600° F. to about 1000° F. to effect catalytic oxidation over the entire surface of said panel and to form thereby a resulting activated platinum plated anode.

5. The method of claim 4 further characterized in that said panel is etched in a ferric chloride-hydrochloric acid solution, and said electro-deposition of platinum thereon is effected in a plating solution of platinic chloride in hydrochloric acid and water maintained at a temperature of from about 160° F. to 170° F.

6. The method of claim 4 further characterized in that said panel is subjected to a second electro-deposition of platinum over the surface thereof, and then rinsed and dried and subjected to a second conditioning in the presence of a high temperature air stream carrying hydrocarbon vapors effecting the catalytic oxidation of such vapors on the platinum surface of said panel.

7. A method for producing a platinum coated titanium anode which comprises, electro-plating a coating of amorphous platinum on a titanium member and heating the thus coated member at a temperature in the range of about 600° F. to 1000° F. in the presence of air containing hydrocarbon vapors in an amount sufficient to effect catalytic combustion of such vapors over the entire surface of said coated member.

8. An anode comprising a titanium member and an amorphous platinum coating on said member, said coating having been activated by heating at a temperature above about 600° F. in the presence of an air stream containing hydrocarbon vapors for a period of time sufficient to initiate catalytic oxidation of such vapors over the entire surface of the platinum coating.

9. A process for producing chlorine which comprises immersing in an alkaline chloride solution a cathode and an anode comprising a titanium member having an amorphous platinum coating which has been activated by heating at a temperature above about 600° F. in the presence of an air stream containing hydrocarbon vapors for a period of time sufficient to initiate catalytic oxidation of such vapors over the entire surface of the platinum coating and passing an electric current through said solution between said anode and cathode.

References Cited in the file of this patent

UNITED STATES PATENTS 2,987,453    DuRose _____ June 6, 1961

FOREIGN PATENTS 1,217,952    France _____ Dec. 14, 1959